(12) United States Patent
Paul et al.

(10) Patent No.: US 9,396,718 B2
(45) Date of Patent: Jul. 19, 2016

(54) AIR CONDITIONING UNIT

(71) Applicant: Behr GmbH & Co. KG, Stuttgart (DE)

(72) Inventors: Michael Paul, Sachsenheim (DE); Klaus Gruber, Waging (DE)

(73) Assignee: MAHLE International GmbH, Stuttgart (DE)

( * ) Notice: Subject to any disclaimer, the term of this patent is extended or adjusted under 35 U.S.C. 154(b) by 377 days.

(21) Appl. No.: 13/948,591

(22) Filed: Jul. 23, 2013

(65) Prior Publication Data

US 2014/0023200 A1  Jan. 23, 2014

(30) Foreign Application Priority Data

Jul. 23, 2012 (DE) .................... 10 2012 212 843

(51) Int. Cl.
| | |
|---|---|
| G10K 11/16 | (2006.01) |
| G10K 11/178 | (2006.01) |
| F24F 13/24 | (2006.01) |
| B60H 1/00 | (2006.01) |

(52) U.S. Cl.
CPC ............ *G10K 11/16* (2013.01); *B60H 1/00564* (2013.01); *F24F 13/24* (2013.01); *G10K 11/1788* (2013.01); *B60H 2001/006* (2013.01); *F24F 2013/247* (2013.01); *G10K 2210/104* (2013.01); *G10K 2210/3219* (2013.01); *G10K 2210/3224* (2013.01); *G10K 2210/509* (2013.01)

(58) Field of Classification Search
CPC ............. G10K 11/16; G10K 11/1788; G10K 2210/3219; G10K 2210/509; G10K 2210/104; G10K 2210/3224; F24F 2013/247; F24F 13/24; B60H 1/00564; B60H 2001/006

USPC ........... 381/71.1, 71.5, 71.7, 359; 165/41, 42; 454/2, 69

See application file for complete search history.

(56) References Cited

U.S. PATENT DOCUMENTS

| | | | |
|---|---|---|---|
| 6,078,671 A | 6/2000 | Kawanishi et al. | |
| 6,178,764 B1 | 1/2001 | Tanaka et al. | |
| 2010/0163209 A1* | 7/2010 | Eguchi ............... | B60H 1/00028 165/41 |

FOREIGN PATENT DOCUMENTS

| | | |
|---|---|---|
| DE | 31 44 052 C2 | 7/1993 |
| DE | 10 2005 057 399 A1 | 6/2007 |
| DE | 698 37 900 T2 | 2/2008 |
| GB | 1 357 330 A | 6/1974 |
| GB | 2 088 951 A | 6/1982 |

OTHER PUBLICATIONS

German Search Report, Application No. DE 10 2012 212 843.3, Mar. 19, 2013, 5 pgs.

* cited by examiner

*Primary Examiner* — David Ton
(74) *Attorney, Agent, or Firm* — Paul D. Strain, Esq.; Strain & Strain PLLC

(57) ABSTRACT

The invention relates to an air conditioning unit having an air duct, having a fan for conveying an airflow through the air duct, having a heat exchanger for the thermal conditioning of the airflow and having an apparatus for noise reduction, which apparatus has a microphone, a loudspeaker and an evaluation and control unit, the microphone being arranged in a housing indentation of the duct wall of the air duct, the housing indentation having a wall and the loudspeaker being arranged at least partially in an opening of the duct wall of the air duct in a manner which is spaced apart from the microphone in the direction of the noise emission, wherein the wall of the housing indentation is curved at least partially, the housing indentation of the microphone being covered with a porous acoustically transparent material.

16 Claims, 7 Drawing Sheets

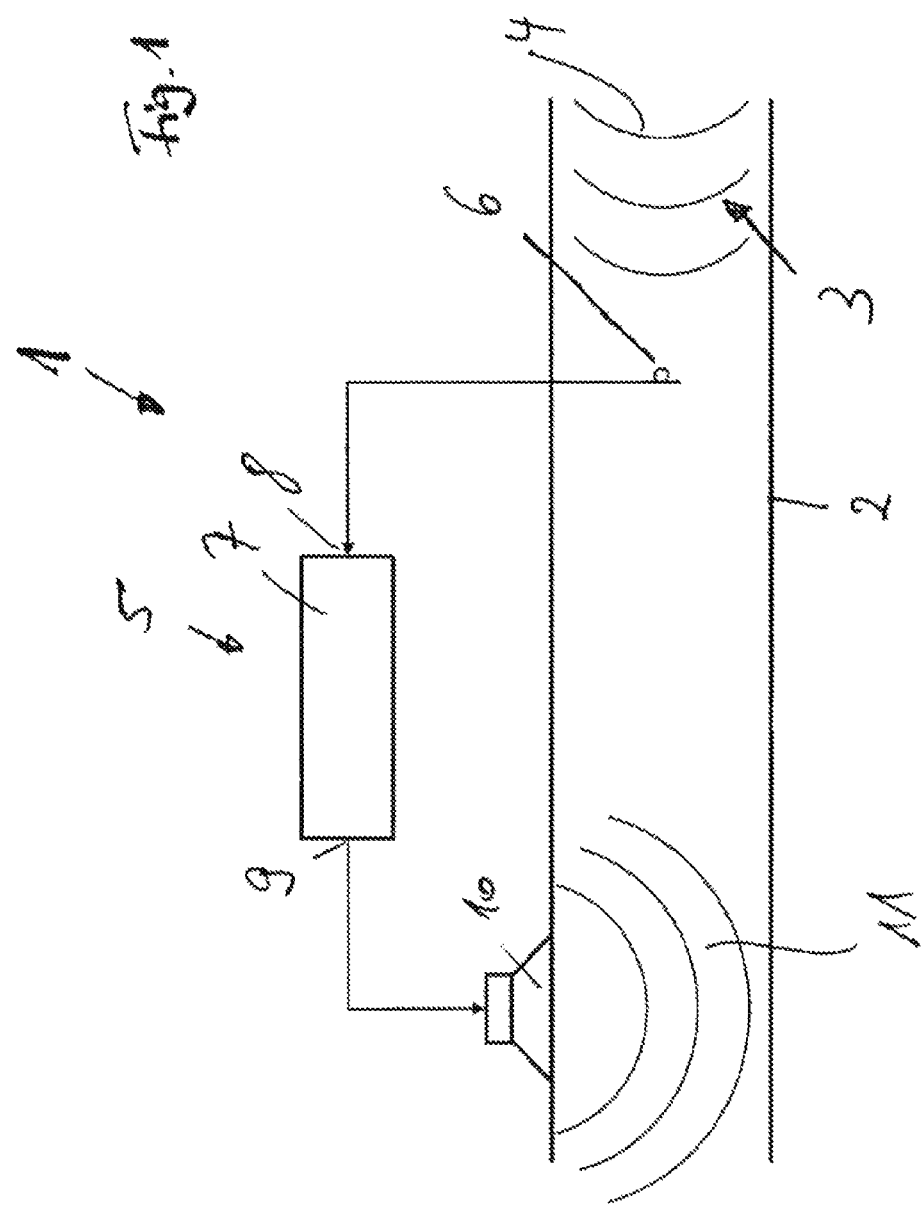

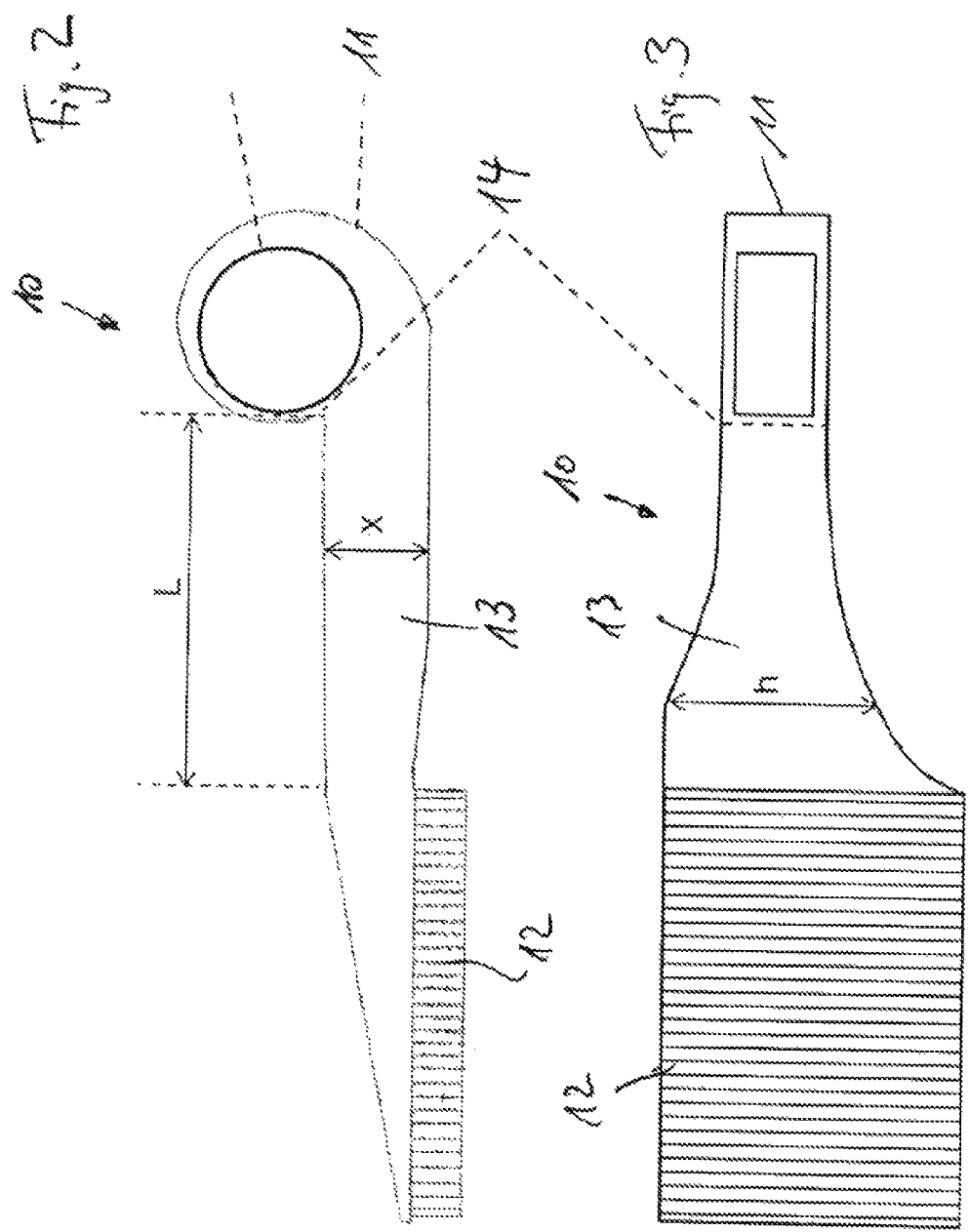

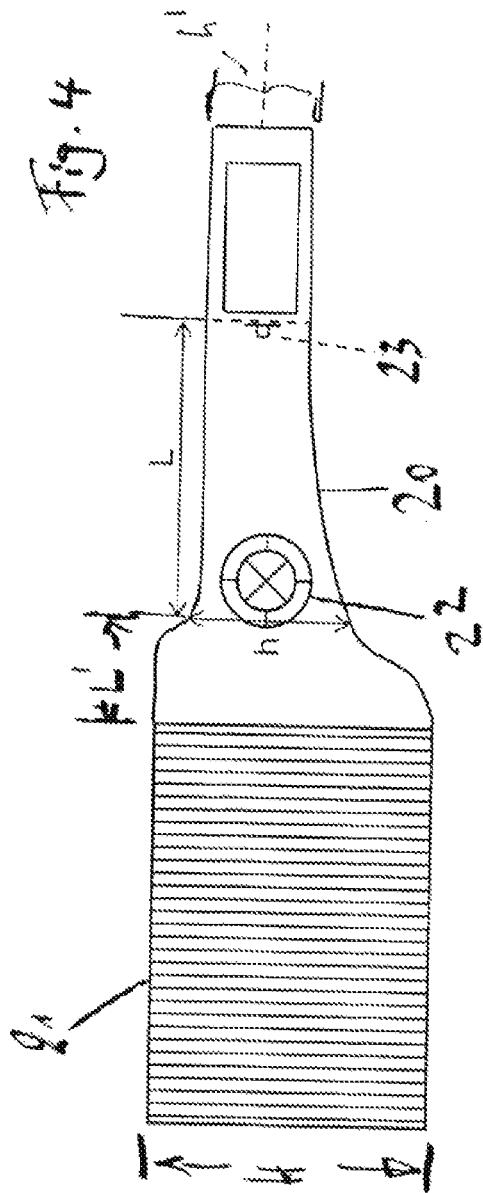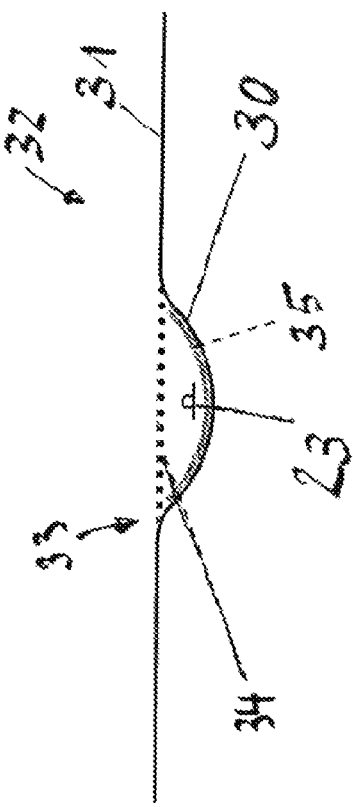

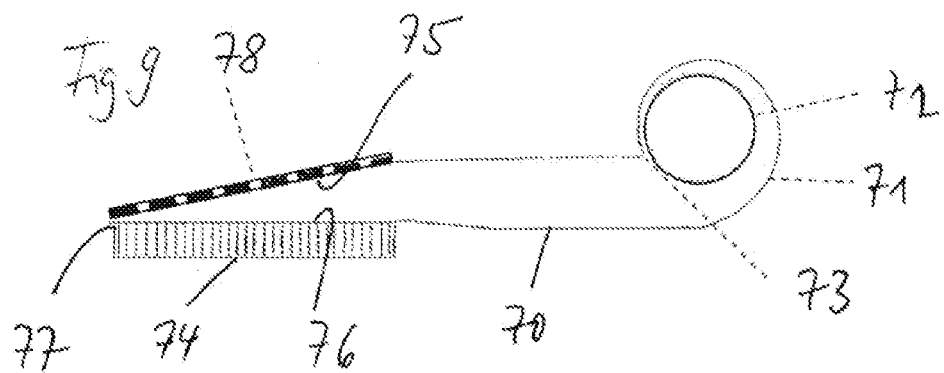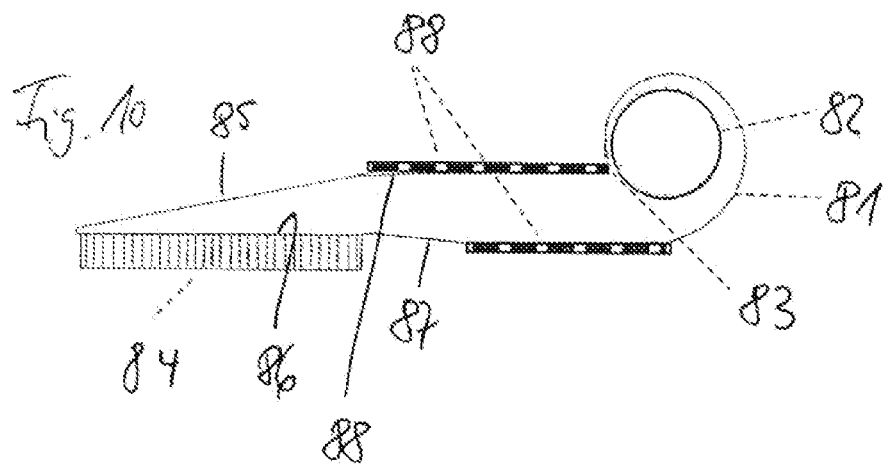

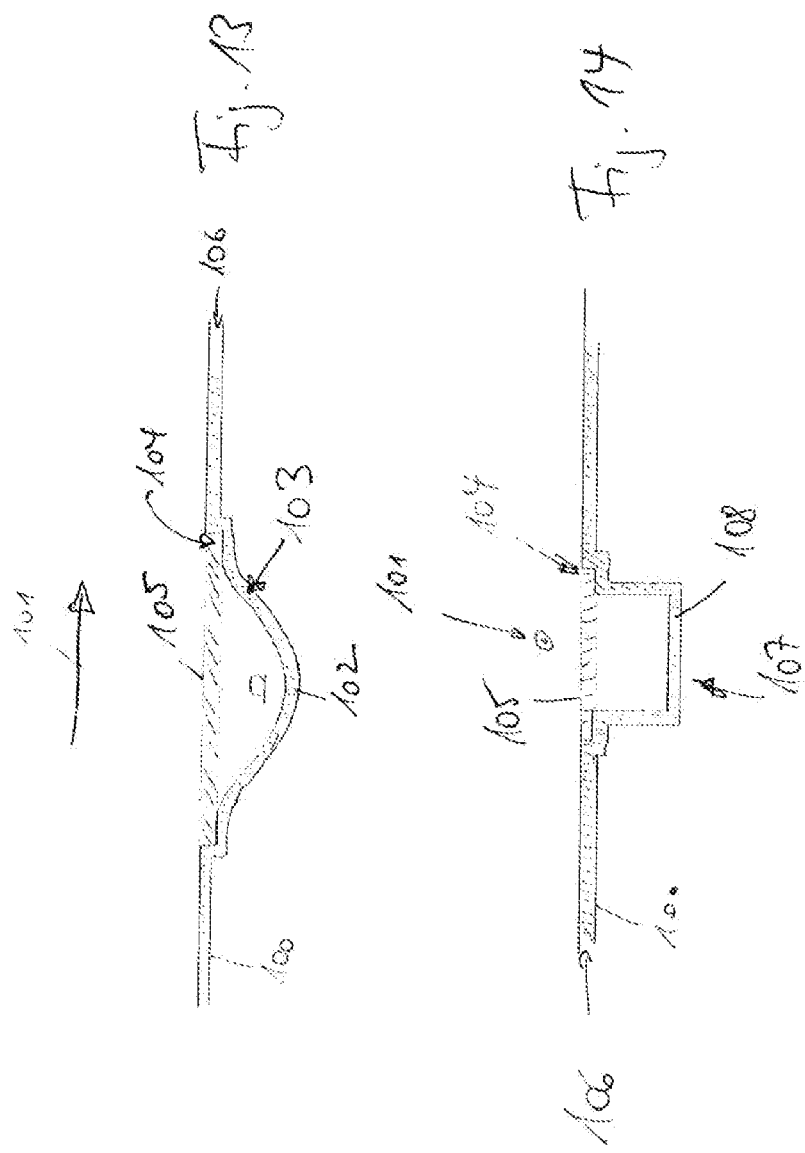

AIR CONDITIONING UNIT

CROSS-REFERENCE TO RELATED PATENT APPLICATIONS

This application is based upon and claims the benefit of priority from prior German Patent Application No. DE 10 2012 212 843.3, filed Jul. 23, 2012, the entire contents of which are incorporated herein by reference in their entirety.

TECHNICAL FIELD

The invention relates to an air conditioning unit, in particular for motor vehicles, having at least one air duct, in accordance with the preamble of claim 1.

PRIOR ART

Air conditioning units are known in the prior art. They have a housing, in which an air duct is formed, for air to flow through. At least one fan and one evaporator are arranged on the inlet side in the air duct, it being possible, furthermore, for an air inlet to be provided with a fresh air inlet and/or a recirculating air inlet. An air filter can also be provided in the air duct, for filtering and cleaning the air which flows in from suspended particles.

In modern vehicles, the engine operating situations are reduced more and more, with the result that, for example at stop phases of traffic lights, the vehicle engine is switched off in an automated manner for reasons of fuel saving, an engine start taking place in an automated manner if, for example, the clutch is actuated manually or a gear is engaged again in the transmission. This is evaluated as a sign of imminent driving off and the vehicle engine is started again.

Since, however, the vehicle engine has up to now represented a certain noise source, it drowned out some other noise sources in the vehicle, with the result that, in particular in the operating situations of the vehicle with the vehicle engine switched off, said other noise sources capture the attention of the vehicle occupants to a more pronounced effect.

In the air conditioning system with the air conditioning units which are used there, the fan for conveying air through at least one air duct in the housing of the air conditioning unit, in particular, produces a noise which can be audible, in particular, when the engine is switched off or there is a high performance requirement.

SUMMARY OF THE INVENTION, OBJECT, SOLUTION, ADVANTAGES

It is the object of the invention to provide an air conditioning unit which has an apparatus for noise reduction, which air conditioning unit reduces the noise of the air conditioning system and, in particular, of the fan of the air conditioning system.

This is achieved by way of the features of claim 1, according to which an air conditioning unit having an air duct is provided, having a fan for conveying an airflow through the air duct, having a heat exchanger for the thermal conditioning of the airflow and having an apparatus for noise reduction, which apparatus has a microphone, a loudspeaker and an evaluation and control unit, the microphone being arranged in a housing indentation of the duct wall of the air duct, the housing indentation having a wall and the loudspeaker being arranged at least partially in an opening of the duct wall of the air duct in a manner which is spaced apart from the microphone in the direction of the noise emission, the wall of the housing indentation being curved at least partially, and the housing indentation of the microphone being covered with a porous acoustically transparent material.

It is advantageous here if the wall of the housing indentation of the air duct has an at least partially outwardly curved first section in the flow direction and relative to the duct wall which adjoins the housing indentation. As a result, the loudspeaker can be accommodated in a favorable manner.

It is also expedient if a second section of the wall of the housing indentation of the air duct is configured as a plane in the flow direction and perpendicularly with respect to the duct wall which adjoins the housing indentation.

Furthermore, it is expedient if the housing indentation of the air duct has at least partially a cutout on its edges which face the air duct, on the surface of which cutout the acoustically transparent material for covering the housing indentation is arranged so as to be flush with the duct wall. As a result, favorable flow and/or sound guidance can be achieved in the duct.

It is also expedient if the cutout runs around the edges of the housing indentation, and that the wall of the housing indentation has a first convexly shaped edge region, starting from the cutout, in the flow direction and relative to the duct wall which adjoins the housing indentation, which first convexly shaped edge region is adjoined by a concavely shaped bottom region which is adjoined by a second convexly shaped edge region which ends in the cutout, and that the wall of the housing indentation of the air duct has two planes in the flow direction and perpendicularly with respect to the duct wall, which two planes adjoin the housing indentation, a first plane starting from the circumferential cutout and a second plane ending in the circumferential cutout.

It is advantageous if the wall of the housing indentation of the air duct has an acoustically damping shroud which is arranged between the wall and the microphone.

It is also advantageous if the apparatus for noise reduction is arranged between the fan and the heat exchanger, between the air inlet and the fan and/or downstream of the heat exchanger.

It is also advantageous if the microphone and/or the loudspeaker are/is arranged in a diffuser and/or a noise reduction apparatus of the air duct.

It is also expedient if the diffuser and/or the noise reduction apparatus are/is that part of the air duct which is arranged between a fan tongue of the fan and the evaporator inlet region of the air duct, the length of the diffuser and/or of the noise reduction apparatus being at least 10 cm.

It is expedient here if the cross-sectional area of the air duct does not increase over the length of the diffuser and/or of the noise reduction apparatus by more than 50%.

Furthermore, it is expedient if the loudspeaker is arranged substantially immediately upstream of the widened portion of the diffuser and/or of the noise reduction apparatus in the flow direction.

It is also expedient if the cross-sectional area of the air duct is widened to 100% in the region of the evaporator inlet.

It is also expedient if a plurality of loudspeakers and/or microphones are arranged laterally in the duct wall of the air duct, the loudspeakers being arranged at the same height in relation to the flow direction of the air or the sound waves. Here, microphones and loudspeakers are special embodiments of sound converters. In addition to microphones and loudspeakers, receiving transducers, sensors or sound pick-ups can also be provided.

Furthermore, it is expedient if at least two loudspeakers are provided which are arranged on adjoining and/or opposite walls of the air duct.

It is also advantageous if the opening or the openings in the duct wall for the loudspeaker or the loudspeakers is/are covered with a porous acoustically transparent material.

It is advantageous here if the sound outlet side of the loudspeaker is of rectangular or longitudinally oval configuration and is as high as the wall of the air duct. This brings about improved filling with sound.

It is advantageous if the duct wall of the air duct is fitted with an acoustically absorbent material.

Furthermore, it is advantageous here if the loudspeaker is arranged in a side duct of the air duct, it being possible for the anti-phase sound which is generated by the loudspeaker to be introduced into the air duct substantially in the direction of propagation of the primary sound.

Further advantageous refinements are described by the following description of the figures and by the subclaims.

BRIEF DESCRIPTION OF THE DRAWINGS

In the following text, the invention will be explained in greater detail on the basis of at least one exemplary embodiment using the drawings, in which:

FIG. 1 shows a diagrammatic illustration of an arrangement of an apparatus for noise reduction, FIG. 2 shows a diagrammatic illustration of an air duct, FIG. 3 shows a diagrammatic illustration of an air duct in another illustration, FIG. 4 shows a diagrammatic illustration of an air duct, FIG. 5 shows a detail of a wall of an air duct with a housing indentation with sound converter, FIG. 9 shows a diagrammatic illustration of an air duct, FIG. 10 shows a diagrammatic illustration of an air duct, FIG. 13 shows a diagrammatic illustration of the wall of an air duct, and FIG. 14 shows a diagrammatic illustration of the wall of an air duct.

PREFERRED EMBODIMENT OF THE INVENTION

Figure 8:
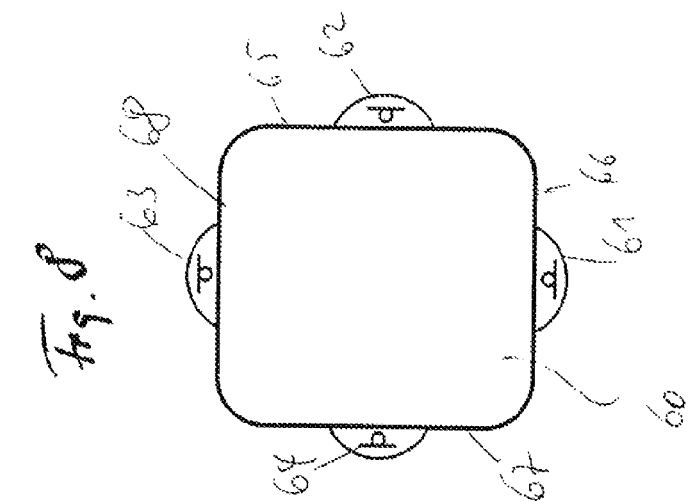
FIG. 8 shows an air duct in cross section.

FIG. 1 shows a simplified diagrammatic illustration of a first exemplary embodiment of an air conditioning unit 1 according to the invention of an air conditioning system of a motor vehicle. The air conditioning unit has an air duct 2, through which an airflow 3 flows which is generated by a fan (not shown). The airflow 3 therefore carries sound waves 4 which are generated, for example, by the fan.

In order to reduce the sound level over a wide spectrum, the air conditioning unit 1 is fitted with an apparatus for noise reduction 5. Said apparatus can advantageously be arranged downstream or upstream of the fan in the airflow direction or at both positions. Upstream of the fan, in particular, the reduction of the noise emission in the circulating air mode or partial circulating air mode is of interest. Here, the fan sucks air out of the interior of the vehicle or mixes air from the interior with external air in the partial circulating air mode.

Here, the apparatus for noise reduction 5 has at least one microphone 6 as acoustic receiver for detecting the noise level, such as, in particular, the fan noise, an evaluation and control unit 7, the microphone 6 serving as the input 8 thereof and the output 9 thereof acting on a sound converter which generates sound waves 11 which are suitable to damp the sound waves 4 which are emitted by the fan by way of destructive interference. In the following text, a microphone is also understood to be an acoustic receiver, it also being possible for other acoustic receivers to be used. In the following text, the sound converter is also used as a type of loudspeaker, it also being possible, however, for other types of sound converters to be used.

FIG. 2 and FIG. 3 show a further diagrammatic arrangement of an air duct 10 of the air conditioning unit. Downstream of the fan 11, the apparatus for noise reduction is attached in the region between the fan 11 and the evaporator 12, that is to say preferably in the region of a diffuser 13. This advantageously allows a considerable reduction in the sound level which is preferably hardly dependent on or independent of the operating mode of the air conditioning unit. Here, the operating mode relates to the circulating air, partial circulating air or fresh air operating mode, and to the various heating and cooling positions of the connected distributor box. The distributor box is not shown here.

Instead of a diffuser, a noise reduction apparatus of another configuration can also be provided. In the following text, the designation diffuser is used for the sake of simplicity.

It is favorable here if the noise production downstream of the apparatus for noise reduction is at least low, with the result that it is masked by the residual noise of the fan in reduction mode.

The diffuser 13 is used according to the invention and has advantageous geometric boundary conditions which are advantageous for the reduction. The length L of the diffuser 13 or of the noise reduction apparatus from the fan tongue 14 as far as the evaporator 12 is at least 10 cm, advantageously 15 cm or more.

Within said length L, the diffuser 13 does not widen to a very pronounced extent. At the transition into the evaporator region 15, the cross section 16 of the diffuser is limited. Here, the diffuser widens significantly preferably only in one dimension h, in order for it to be possible to load the evaporator in an optimum manner with air over its entire height. In the other dimension x, the width of the diffuser remains approximately constant or is even reduced somewhat.

In the direction of the width x, 15 cm are a preferred width which is not to be exceeded or is not to be exceeded substantially. A width x of less than 15 cm, that is to say, for example, 10 cm, 7.5 cm or 5 cm, is also advantageous. The quality of the effect of the reduction apparatus is then limited by the cross section in the height h. This value for the height h should be smaller than 20 cm, preferably smaller than 17 cm, in the region of the reduction apparatus upstream of the evaporator, in order to achieve a high quality up to approximately 1 kHz. Smaller cross sections increase the upper limit frequency proportionally in the opposite direction. This means that approximately 2 kHz are achieved at 8.5 cm height h. Here, the height h is always defined relative to the vertical of the evaporator position.

A favorable diffuser shape is shown in FIG. 4. No widening or only small widening of the air duct as diffuser 20 takes place in a region of the length L, the region of the reduction apparatus. Here, the widening from the height h' to the value h is only approximately 50%. Downstream of this in the airflow direction, the widening is carried out on a short length L' to the height H of the evaporator 21. Here, the widening from h' to H can be approximately the factor 3. Starting from h, the widening to H is approximately twice or more. Immediately upstream of the widening portion at the end of the section L of the diffuser 20, a loudspeaker 22 is attached laterally which is actuated by an evaluation and control unit and emits the anti-phase sound. The loudspeaker 22 as sound converter is preferably attached on a relatively long side face 23 of the diffuser 20 and is preferably on the side of the diffuser, on which the fan tongue of the fan is also arranged.

The geometry of the loudspeaker is preferably but optionally adapted to the duct cross section of the diffuser. Two smaller loudspeakers can also be attached one above another vertically, which loudspeakers can be actuated jointly.

The loudspeaker 22 or the loudspeakers as sound converters are preferably insulated acoustically from the external world by a resonance volume, with the result that the emission of the sound of the loudspeaker takes place as far as possible exclusively into the air duct, that is to say into the diffuser 20. The entire volume of the resonance volume should be at least 0.2 l, preferably from 0.5 to 1.5 l. The ideal value of the resonance volume is dependent on the loudspeakers which are used.

The microphone 23 is to be attached preferably immediately downstream of the fan tongue, and preferably not more than from 2 cm to 6 cm away from the fan tongue, which microphone 23 detects the disruptive noise and/or the fan noise and is connected to the input of the evaluation and control unit.

Flow speeds of over 20 m/s can certainly prevail at this point. It is therefore advantageous if the microphone is not positioned in the flow itself and is, as it were, flowed around completely, but rather that the microphone is arranged laterally on the wall.

According to FIG. 5, the arrangement of the microphone 23 takes place in a lateral housing indentation 30 of the wall 31 of the diffuser 32. Here, an advantageous housing indentation 30 has a round, curved contour which is arched in the manner of a circular segment and merges in a curved manner into the planar wall.

The diameter of the housing indentation which can be polygonal, round or oval as viewed in the plane of the wall should be selected to be small and should ideally not substantially exceed 7 cm.

In order to protect against the direct flow, the indentation 30 is provided toward the airflow side 33 with a cover 34 which is preferably formed from an acoustically transparent, porous material, for example a nonwoven material.

The material preferably has a highly elastic rigidity and the specific flow resistance should not be selected to be too low. It is preferably greater than 200 Ns/m$^3$; ideally, it is in the range from 600 to 1500 Ns/m$^3$. The airflow itself remains virtually uninfluenced by said essentially planar arrangement of the acoustically transparent cover 34.

The microphone 23 is optionally encapsulated with a layer of a sound-absorbing material, such as a foamed material. It can also be advantageous if the inner side of the housing indentation is trimmed with a sound-absorbing material 35.

An electret microphone is preferably used as microphone.

Figure 7:
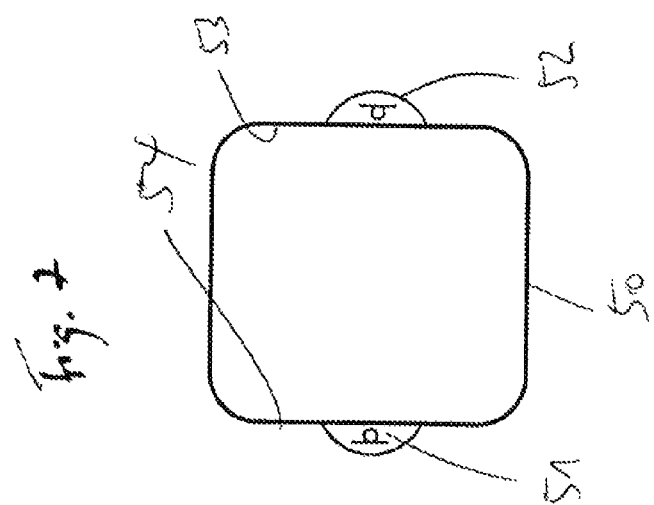
FIG. 7 shows an air duct in cross section.
Figure 6:
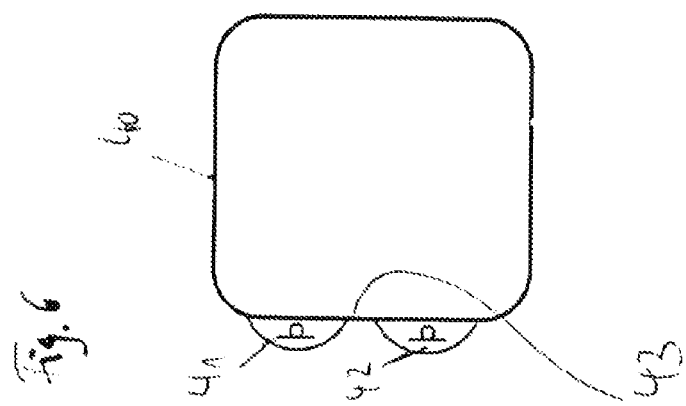
FIG. 6 shows an air duct in cross section.

According to the invention, it is also advantageous if a plurality of microphones are preferably arranged on the same flow level, that is to say approximately at the same position in relation to the flow direction. This advantageously serves to make it possible to further suppress turbulent fluctuations by way of signal averaging. FIGS. 6 to 8 show exemplary embodiments of arrangements of a plurality of microphones.

FIG. 6 shows a substantially rectangular air duct 40, in which the two microphones 41, 42 are arranged on the same level in relation to the airflow, the two microphones 41, 42 being arranged in or on a wall 43 of the rectangular air duct 40 and being arranged above one another or next to one another on the wall 43.

FIG. 7 shows a substantially rectangular air duct 50, in which the two microphones 51, 52 are arranged on the same level in relation to the airflow, the two microphones 51, 52 being arranged in or on opposite walls 53, 54 of the rectangular air duct 50. Here, the arrangement is in each case approximately in the center of the respective wall. As an alternative, the two microphones can also be attached to two adjacent walls which are arranged at an angle of 90° with respect to one another.

FIG. 8 shows a substantially rectangular air duct 60, in which four microphones 61, 62, 63 and 64 are arranged on the same level in relation to the airflow, the four microphones 61, 62, 62, 64 being arranged in each case in or on one of the four walls 65, 66, 67 and 68 of the rectangular air duct 60. Here, the arrangement is in each case approximately in the center of the respective wall.

The installation location of microphone and loudspeaker of the apparatus is preferably selected in such a way that the at least one microphone and the loudspeaker are spaced apart from one another in the direction of the sound emission or the airflow by at least 8 cm, preferably at least from 12 cm to 15 cm or more.

According to FIGS. 9 and 10, the air duct is provided between the fan and the evaporator at least in regions with a sound-absorbing material, in order to improve the stability of the system and to reduce sound reflections on the wall of the air duct.

It is advantageous here if the sound-absorbing material, advantageously a foamed material or a nonwoven material, is attached over the full surface area on at least one wall of the air duct. It can also be advantageous if the sound-absorbing material is attached to a wall on both sides or all sides of the air duct.

FIG. 9 shows an air duct 70 with an inlet-side fan 71 with a fan wheel 72 and a fan tongue 73. The air duct 70 is elongate and preferably has a rectangular or square cross section with a cross-sectional area which changes over the length in the airflow direction. An evaporator 74 is arranged downstream of the fan 70, the air duct 70 being of tapered configuration in the region of the evaporator 74 in the sectional plane according to FIG. 2, the rear wall region 75 with respect to the inlet face 76 of the evaporator being of inclined configuration relative to the inlet face 76 of the evaporator 74. In the plane perpendicularly with respect to the sectional plane which is shown, there can certainly be a widening of the cross section of the air duct according to FIG. 3, which is not shown here, however. Accordingly, the wall 75 tapers acutely toward the rear end 77 of the evaporator 74. According to FIG. 9, the wall which lies opposite the evaporator is fitted with a sound-absorbing material 78. Here, the sound-absorbing material 78 is configured and attached as a flat pad. As a result, sound reflections are reduced on the rear wall 75 which is part of an air or distributor box of the evaporator. The thickness of the sound-absorbing material 78 is advantageously approximately from 0.3 cm to 2 cm, advantageously from 0.5 cm to 1.5 cm, in particular approximately 1 cm.

FIG. 10 shows an air duct 80 according to FIG. 2, having an inlet-side fan 81 with a fan wheel 82 and a fan tongue 83. The air duct 80 is elongate and preferably has a rectangular or square cross section with a cross-sectional area which changes over the length in the airflow direction. An evaporator 84 is arranged downstream of the fan 80, the air duct 80 being of tapering configuration in the sectional plane in the region of the evaporator 84, and the rear wall region 85 with respect to the inlet face 86 of the evaporator being of inclined configuration relative to the inlet face 86 of the evaporator 84. Here, the wall tapers acutely toward the rear end of the evaporator 84. According to FIG. 10, the two walls 87, 88 of the air duct which lie opposite one another are fitted with a sound-absorbing material 89. Here, the sound-absorbing material 89 is configured and attached as a flat pad. As a result, sound reflections are reduced on the walls 87, 88 which lie opposite one another and lead to the evaporator. The thickness of the sound-absorbing material 88 is advantageously approximately from 0.3 cm to 2 cm, advantageously from 0.5 cm to 1.5 cm, in particular approximately 1 cm.

In the previous figures, the apparatus for noise reduction is arranged on the side which lies downstream of the fan. However, an apparatus for noise reduction can also be arranged on the intake side of the fan, that is to say upstream of the fan. In this case, an intake duct is to be provided which adjoins the fan upstream of the fan. Here, the length and the cross section of the intake duct are to be configured substantially as those of the above-described air duct downstream of the fan which is described as a diffuser.

An intake duct can certainly have a constant cross section, the height h advantageously being less than 15 cm and the width x advantageously being less than 10 cm. Here, the length of the duct corresponds to the length L as has already been defined for the diffuser.

This applies correspondingly to the arrangement of the electro-acoustic components, such as loudspeakers or sound converters and microphones, the microphone advantageously being positioned closer to the sound source than the loudspeaker.

In the case of an intake duct of this type, a widened duct portion is not necessary, but can nevertheless be present as an alternative.

In order to improve the acoustic quality, it is advantageous to shroud the intake duct, just like the diffuser, at least partially or else completely with a sound-absorbing material, in this regard see also FIGS. 9 and 10.

A further concept according to the invention is realized by the fact that the loudspeaker or loudspeakers is/are arranged next to the respective air duct in such a way that it/they limits/limit the sound which emanates from it/them at least approximately in the sound propagation direction. This results in a sound propagation of the sound of the loudspeaker which is substantially parallel to the propagation of the sound of the disruptive noise.

Figure 11:
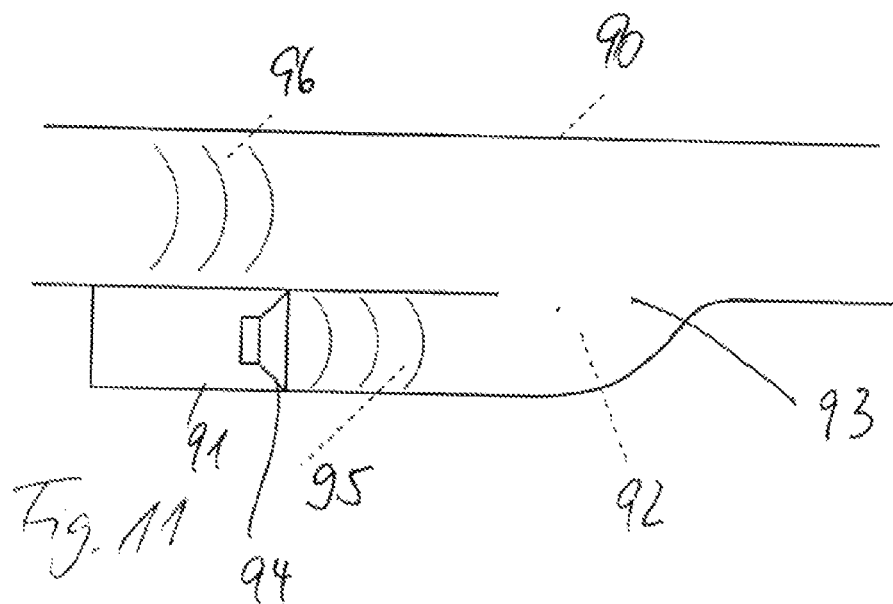
FIG. 11 shows a detail of an air duct with a loudspeaker in a side duct.

FIG. 11 shows this diagrammatically. Here, an air duct 90 is provided which is of substantially elongate configuration. A side duct 91 is provided parallel to the air duct 90, which side duct 91 opens with its end region 92 via the opening 93 into the air duct 90. Here, the side duct 92 is elongate just like the air duct 90 and is oriented parallel to said air duct 90. The loudspeaker 94 is arranged in the side duct 92 in such a way that the sound waves 95 which emanate from it propagate substantially in the same direction as the sound waves 96 which propagate in the air duct 90. In this exemplary embodiment, the abovementioned minimum spacings between the microphone and the loudspeaker apply in an analogous manner to the difference of the sound paths of fan and loudspeaker as far as the region of superimposition. In this case, the control is set by means of the control unit in such a way that the destructive superimposition is achieved at the confluence of the two sound propagation paths.

Figure 12:
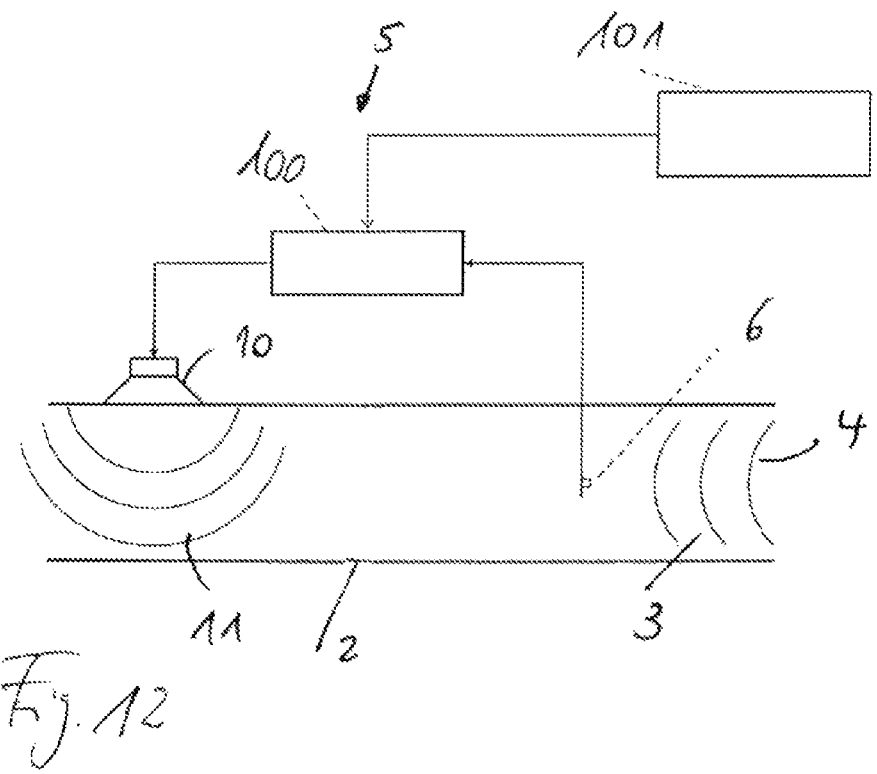
FIG. 12 shows a diagrammatic illustration of an air duct with an apparatus for noise reduction.

According to a method according to the invention, the evaluation and control unit 100 according to FIG. 12 can communicate with a control unit 101 of the air conditioning unit or the air conditioning system, with the result that suitable control or regulation can be performed in each case depending on the operating mode, that is to say, for example, depending on air distribution and/or temperature mixing.

Furthermore, it is advantageous if the control unit 100 communicates with the data bus system of the vehicle, with the result that, for example, a status request or a recalibration can be carried out. For a case of this type, a further microphone which is arranged downstream of the loudspeakers as viewed from the sound source would be advantageous.

An apparatus for noise reduction could also be installed on the air conditioning unit itself in the region of the air outlets. Here, each outlet could also be provided with a dedicated apparatus for noise reduction.

FIGS. 13 and 14 show an air duct 100 in the airflow direction 101 and transversely or perpendicularly with respect to the airflow direction 101.

It can be seen in FIG. 13 that the housing indentation 102 of the air duct has an arcuate, round or soft profile 103 with a step-like transition 104 from the plane 106 of the air duct 100. The cover 105 is inserted into said step-like transition 104, with the result that there is a stepless transition from the duct wall of the air duct 100 to the cover 105.

It can be seen in FIG. 14 that the housing indentation 102 of the air duct has a box-shaped profile 107 with a straight bottom profile 108 and with a step-like transition 104 from the plane 106 of the air duct 100, in a cross section perpendicularly with respect to the airflow direction. The cover 105 is inserted into said step-like transition 104, with the result that there is a stepless transition from the duct wall of the air duct 100 to the cover 105.

This brings about a situation where there is no disadvantageous influencing of the airflow.

In one advantageous exemplary embodiment, it is expedient if the sound-emitting side of the loudspeaker is configured so as to be flush with the inner side of the duct wall of the air duct.

If the indentation is covered, it can be advantageous if it is covered by an acoustically transparent material which is composed of a porous material.

Here, it can also be advantageous in a further exemplary embodiment if the housing indentation has one, advantageously a single, wall.

The invention claimed is:
1. An air conditioning unit comprising
an air duct comprising a diffuser arranged between a fan tongue of a fan and a heat exchanger inlet region of the air duct,
a fan for conveying an airflow through the air duct,
a heat exchanger for the thermal conditioning of the airflow, and
an apparatus for noise reduction, which apparatus comprises a microphone, a loudspeaker and an evaluation and control unit,
wherein the microphone is arranged in a housing indentation of the duct wall of the air duct, wherein the housing indentation comprises a wall, wherein the wall of the housing indentation is curved at least partially, wherein the housing indentation is covered with a porous acoustically transparent material,
wherein the loudspeaker is arranged at least partially in an opening of the duct wall of the air duct in a manner which is spaced apart from the microphone in the direction of the noise emission,
wherein the air duct has a width (x) and a height (h), wherein the diffuser is of a length (L) shorter than a length of the air duct, wherein length (L) is at least 10 cm, wherein over length (L) the diffuser has a relatively constant width (x) of at most 15 cm and has a height (h) of at most 20 cm, wherein over length (L) the height (h)

is widened by at most 50%, wherein a height of the heat exchanger inlet region of the air duct is at least 100% greater than height (h).

2. The air conditioning unit according to claim 1, wherein the wall of the housing indentation of the air duct has an at least partially outwardly curved first section in the flow direction and relative to the duct wall which adjoins the housing indentation.

3. The air conditioning unit according to claim 1, wherein a second section of the wall of the housing indentation of the air duct is configured as a plane in the flow direction and perpendicularly with respect to the duct wall which adjoins the housing indentation.

4. The air conditioning unit according to claim 1, wherein the housing indentation of the air duct has at least partially a cutout on its edges which face the air duct, on the surface of which cutout the acoustically transparent material for covering the housing indentation is arranged so as to be flush with the duct wall.

5. The air conditioning unit according to claim 4, wherein the cutout runs around the edges of the housing indentation, and the wall of the housing indentation has a first convexly shaped edge region, starting from the cutout, in the flow direction and relative to the duct wall which adjoins the housing indentation, which first convexly shaped edge region is adjoined by a concavely shaped bottom region which is adjoined by a second convexly shaped edge region which ends in the cutout, and the wall of the housing indentation of the air duct has two planes in the flow direction and perpendicularly with respect to the duct wall, which two planes adjoin the housing indentation, a first plane starting from the circumferential cutout and a second plane ending in the circumferential cutout.

6. The air conditioning unit according to claim 1, wherein the wall of the housing indentation of the air duct has an acoustically damping shroud which is arranged between the wall and the microphone.

7. The air conditioning unit according to claim 1, wherein the apparatus for noise reduction is arranged between the fan and the heat exchanger, between the air inlet and the fan and/or downstream of the heat exchanger.

8. The air conditioning unit according to claim 1, wherein the microphone and the loudspeaker are arranged in the diffuser and a noise reduction apparatus of the air duct.

9. The air conditioning unit according to claim 8, wherein the cross-sectional area of the air duct does not increase over the length of the diffuser and/or of the noise reduction apparatus by more than 50%.

10. The air conditioning unit according to claim 8, wherein the loudspeaker is arranged substantially immediately upstream of the widened portion of the diffuser and/or of the noise reduction apparatus in the flow direction.

11. The air conditioning unit according to claim 1, wherein a plurality of loudspeakers or microphones are arranged laterally in the duct wall of the air duct, the loudspeakers being arranged at the same height in relation to the flow direction of the air or the sound waves.

12. The air conditioning unit according to claim 11, wherein at least two loudspeakers are provided which are arranged on adjoining or opposite walls of the air duct.

13. The air conditioning unit according to claim 1, wherein the opening or the openings in the duct wall for the loudspeaker or the loudspeakers are covered with a porous acoustically transparent material.

14. The air conditioning unit according to claim 1, wherein the sound outlet side of the loudspeaker is of rectangular or longitudinally oval configuration and is as high as the wall of the air duct.

15. The air conditioning unit according to claim 1, wherein the duct wall of the air duct is fitted with an acoustically absorbent material.

16. The air conditioning unit according to claim 1, wherein the loudspeaker is arranged in a side duct of the air duct, it being possible for the anti-phase sound which is generated by the loudspeaker to be introduced into the air duct substantially in the direction of propagation of the primary sound.

* * * * *